United States Patent
Kuiper et al.

(10) Patent No.: US 12,378,265 B2
(45) Date of Patent: *Aug. 5, 2025

(54) PROCESS FOR PREPARING ORGANOTIN COMPOUNDS

(71) Applicant: ENTEGRIS, INC., Billerica, MA (US)

(72) Inventors: David Kuiper, Brookfield, CT (US);
David M. Ermert, Danbury, CT (US);
Thomas Coyne, Stormville, NY (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,100

(22) Filed: May 23, 2023

(65) Prior Publication Data

US 2023/0295196 A1    Sep. 21, 2023

Related U.S. Application Data

(63) Continuation of application No. 17/585,971, filed on Jan. 27, 2022, now Pat. No. 11,697,660.

(60) Provisional application No. 63/143,550, filed on Jan. 29, 2021.

(51) Int. Cl.
*C07F 7/22* (2006.01)

(52) U.S. Cl.
CPC .......... *C07F 7/2284* (2013.01); *C07F 7/2296* (2013.01)

(58) Field of Classification Search
None
See application file for complete search history.

(56) References Cited

U.S. PATENT DOCUMENTS

| | | | |
|---|---|---|---|
| 10,787,466 B2 | 9/2020 | Edson et al. | |
| 11,358,975 B2* | 6/2022 | Ermert | C07F 7/2284 |
| 11,685,752 B2* | 6/2023 | Ermert | C07F 7/2296 |
| | | | 556/87 |
| 11,697,660 B2* | 7/2023 | Kuiper | H01M 4/387 |
| | | | 556/87 |
| 2016/0116839 A1* | 4/2016 | Meyers | G03F 7/0042 |
| | | | 430/326 |
| 2017/0102612 A1* | 4/2017 | Meyers | G03F 7/162 |
| 2019/0315781 A1* | 10/2019 | Edson | C07F 7/2224 |
| 2019/0315782 A1 | 10/2019 | Edson et al. | |
| 2019/0337969 A1* | 11/2019 | Odedra | C23C 16/505 |
| 2020/0239498 A1* | 7/2020 | Clark | G03F 7/0042 |
| 2020/0241413 A1* | 7/2020 | Clark | G03F 7/0042 |
| 2021/0013034 A1* | 1/2021 | Wu | H01L 21/02181 |
| 2021/0024552 A1 | 1/2021 | Edson et al. | |
| 2022/0002323 A1 | 1/2022 | Ermert et al. | |
| 2022/0064192 A1* | 3/2022 | Edson | C07F 7/2208 |
| 2022/0153763 A1 | 5/2022 | Ermert et al. | |
| 2022/0242889 A1 | 8/2022 | Ermert et al. | |
| 2022/0402945 A1* | 12/2022 | Ermert | C07F 7/2208 |
| 2022/0411446 A1* | 12/2022 | Jilek | G03F 7/325 |
| 2023/0303596 A1* | 9/2023 | Ermert | C07F 7/2296 |
| 2023/0391803 A1* | 12/2023 | Ermert | C07F 7/2284 |
| 2023/0391804 A1* | 12/2023 | Yang | C07F 7/2296 |

FOREIGN PATENT DOCUMENTS

| | | | | |
|---|---|---|---|---|
| GB | 1146435 A | | 3/1969 | |
| WO | WO-2017066319 A2 * | 4/2017 | | C23C 14/086 |
| WO | 2019199467 A1 | | 10/2019 | |
| WO | WO-2019217749 A1 * | 11/2019 | | G03F 7/004 |
| WO | 2020102085 A1 | | 5/2020 | |

OTHER PUBLICATIONS

J. Lorberth et al., 16 Journal of Organometallic Chemistry, 235-248 (1969) (Year: 1969).*
Bhattacharya et al., Indian Journal of Chemistry, Reactions of Tin-Naphthyl Bond with Halogens and Pseudohalogens, vol. 20A, pp. 1119-1121, 1981.
Bhattacharya et al., Indian Journal of Chemistry, Studies on Synthetic and Structural Aspects of Some New Unsymmetric and Asymmetric Organotin (IV) Halides, Pseudohalides and Carboxylates and Their Complex Anions, vol. 18A, pp. 231-235, 1979.
Bullard et al., Journal of the American Chemical Society, Methylphenyl-Stannanes, vol. 49, pp. 1368-1373, May 1927.
Bulten, Journal of Organometallic Chemistry, A Convenient Synthesis of (C1—C18) Alkyltin Trihalides, vol. 97, pp. 167-172, 1975.
Cuvigny et al., Série C, Sciences chimiques, Comptes rendus hebdomadaires des séances de l'Académie des sciences, vol. 269, pp. 1398-1402.
Hanssgen et al, Synthese der ersten mono-t-butylzinn-elementverbindungen, Journal of organometallic chemistry, vol. 293, pp. 191-195, 1985.
Jones et al., Journal of the chemical society, 352, Amino-derivatives of metals and metalloids, Part I. Preparation of aminostannanes, stannylamines, and stannazanes, pp. 1944-1951, 1965.
Mesubi et al., Inorganic and Nuclear Chemistry Letters, Halogen cleavage of cyanomethyl triphenyltin, vol. 12, pp. 469-474, 1976.
Shekouhian, J. Recent Adv. Appl. Sci., Organotin Compound—a Mechanistic Approach for Their Synthesis, vol. 3, pp. 483-486, 1988.
Zobel et al., Organometallics, American Chemical Society, Easy General Method for Interhalide Conversions in Organotin Compounds, vol. 18, No. 23, pp. 4889-4890, 1999.

* cited by examiner

Primary Examiner — Alexander R Pagano

(57) ABSTRACT

Provided is a facile process for preparing certain organotin compounds having alkyl and alkylamino substituents. The process provides organotin precursor compounds, for example tris(dimethylamido)isopropyl tin, in a highly pure form. As such, the products of the process are particularly useful in the deposition of high-purity tin oxide films in, for example, extreme ultraviolet light (EUV) lithography techniques used in microelectronic device manufacturing.

4 Claims, 2 Drawing Sheets

PROCESS FOR PREPARING ORGANOTIN COMPOUNDS

CROSS-REFERENCE TO RELATED APPLICATIONS

This application is a continuation of U.S. patent application Ser. No. 17/585,971, filed Jan. 27, 2022, which claims the benefit under 35 USC 119 of U.S. Provisional Patent Application No. 63/143,550 filed Jan. 29, 2021, the disclosures of which are hereby incorporated herein by reference in their entirety.

TECHNICAL FIELD

This invention belongs to the field of organotin chemistry. In particular, it relates to a facile process for preparing certain organotin compounds, for example tris(dimethylamido)isopropyl tin with extremely high selectivity.

BACKGROUND

Certain organotin compounds have been shown to be useful in the deposition of highly pure tin (II) oxide in applications such as extreme ultraviolet (EUV) lithography techniques used in the manufacture of certain microelectronic devices.

Of particular interest are organotin compounds having a combination of alkylamino groups and alkyl groups, which are useful as liquid precursors in the deposition of tin-containing films onto microelectronic device substrates. Accordingly, there is a need for improved methodology for manufacturing such organotin compounds in highly pure forms for use in the deposition of highly pure tin oxide films.

SUMMARY

Provided is a facile process for preparing certain organotin compounds having alkyl and alkylamino substituents. The process is especially useful in those circumstances where polyalkyl by-products cannot be effectively removed via distillation, for example dialkyl tin dialkylamides versus monoalkyl-species, due to their close proximity in boiling points. The process provides organotin precursor compounds, for example tris(dimethylamido)isopropyl tin (CAS No. 1913978-89-8), in a highly pure form. As such, the products of the process are particularly useful as precursors in the deposition of tin oxide films in, for example, extreme ultraviolet light (EUV) lithography techniques used in microelectronic device manufacturing.

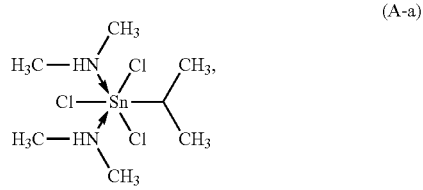

Figure 2:
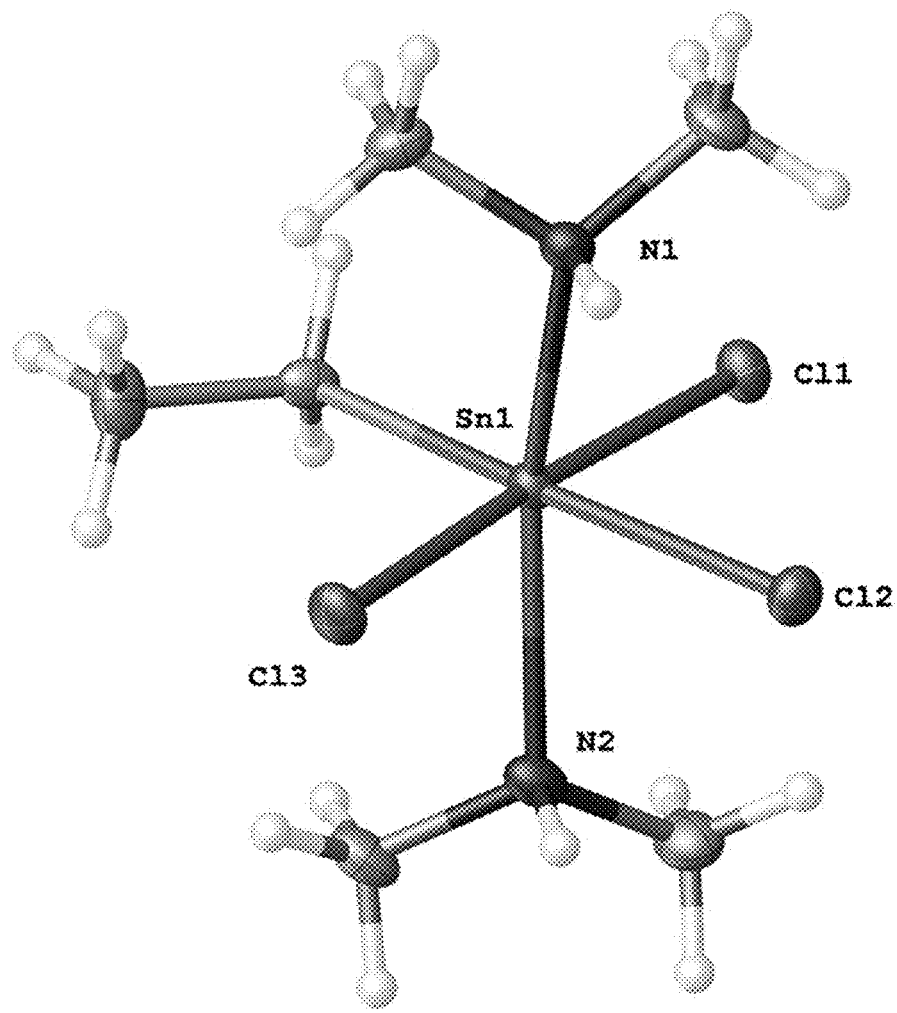

FIG. 2 is a crystal structure depiction of a compound of Formula (A-d):

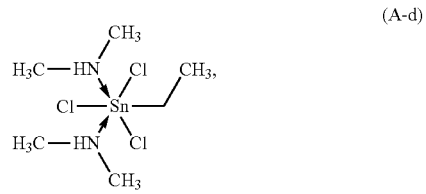

i.e., the bis-dimethyl amine Lewis base adduct of ethyl tin trichloride.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

In a first aspect, the invention provides a process for preparing a composition comprising a compound of Formula (I):

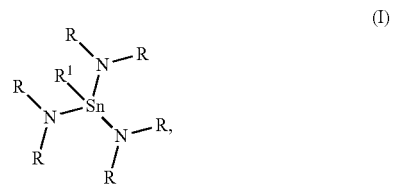

wherein each R is independently chosen from a $C_1$-$C_5$ alkyl group, and $R^1$ is chosen from a $C_1$-$C_5$ alkyl group, which comprises combining:
  a) a compound of Formula $R^1SnX_3$, wherein X is chosen from Cl, I, and Br,
  b) a compound of Formula $Li(R)_2N$, and
  c) a compound of Formula $R_2NH$,
wherein the compound of Formula $R_2NH$ is present in a molar excess over the compound of Formula $R^1SnX_3$. For example, the composition comprising the compound of Formula (I) can be prepared by a process comprising: contacting a compound of Formula $R^1SnX_3$ with a compound of Formula $Li(R)_2N$ and a compound of Formula $R_2NH$. One or more of the steps of this process can preferably be performed under conditions that minimize exposure of the materials and/or products to light.

The $C_1$-$C_5$ alkyl group includes straight or branched chain alkyl groups. Examples include methyl, ethyl, propyl, isopropyl, n-butyl, t-butyl, sec-butyl, n-pentyl, isopentyl, and sec-pentyl. Each of R and $R^1$ herein are independently chosen from such groups, and thus can define compounds of Formula (I) wherein one or more groups are different from the others. Preferably, R and $R^1$ are independently chosen from a $C_1$-$C_3$ alkyl group.

As set forth above, the compound of Formula $R_2NH$ (i.e., the dialkylamine) is present in a molar excess relative to compound of Formula $R^1SnX_3$; in one embodiment, this molar excess is at least about 0.15 molar equivalents relative to the amount of the compound of Formula $R^1SnX_3$. In another embodiment, the compound of Formula $R_2NH$ is dimethylamine and $R^1$ is isopropyl. In another embodiment, $R^1$ is isopropyl and X is chloro. In another embodiment the compound of Formula $Li(R)_2N$ is lithium dimethylamide, the compound of Formula $R_2NH$ is dimethylamine, and the compound of Formula $R^1SnX_3$ is isopropyl-tin trichloride.

In this aspect, examples of compounds of Formula (I) include: tris(dimethyl-amido)isopropyl tin; tris(diethylamido)isopropyl tin; tris(dipropylamido)isopropyl tin; tris(methylethylamido)isopropyl tin; tris(diisopropylamido)isopropyl tin; tris(di-t-butyl-amido)isopropyl tin; tris(di-n-butylamido)isopropyl tin; tris(di-sec-butylamido)isopropyl tin; tris(di-neopentylamido)isopropyl tin; tris(dimethylamido)methyl tin; tris(diethylamido)methyl tin; tris(di-n-propylamido)methyl tin; tris(methylethylamido)methyl tin; tris (diisopropylamido)methyl tin; tris(di-t-butylamido)methyl tin; tris(di-n-butylamido)methyl tin; tris(di-sec-butylamido) methyl tin; tris(di-neopentylamido)methyl tin; tris(dimethylamido)ethyl tin; tris(diethylamido)ethyl tin; tris(di-n-propylamido)ethyl tin; tris(methylethylamido)ethyl tin; tris (diisopropylamido)ethyl tin; tris(di-t-butylamido)ethyl tin; tris(di-n-butylamido)ethyl tin; tris(di-sec-butylamido)ethyl tin; tris(di-neopentylamido)ethyl tin; tris(dimethylamido)n-propyl tin; tris(diethylamido)n-propyl tin; tris(di-n-propylamido)n-propyl tin; tris(methylethylamido)n-propyl tin; tris (diisopropylamido)n-propyl tin; tris(di-t-butylamido)n-propyl tin; tris(di-n-butylamido)n-propyl tin; tris(di-sec-butylamido)n-propyl tin; tris(di-neopentylamido)n-propyl tin; tris(dimethylamido)n-butyl tin; tris(diethylamido)n-butyl tin; tris(dipropylamido)n-butyl tin; tris(methylethylamido)n-butyl tin; tris(diisopropylamido)n-butyl tin; tris(di-t-butylamido)n-butyl tin; tris(di-n-butylamido)n-butyl tin; tris(di-sec-butylamido)n-butyl tin; tris(di-neopentylamido) n-butyl tin; and the like.

The compounds of Formula $R^1SnX_3$ can be prepared by a redistribution reaction between, for example, iPrSnPh$_3$ (iPr=isopropyl and Ph=phenyl) and SnCl$_4$. In certain embodiments, the stoichiometry can be varied between 1:1 and 3:1 ($R^1SnPh_3$:$SnX_4$). In one embodiment, the compound of Formula $R^1SnX_3$ is distilled prior to use one or more times. In the practice of the invention, wherein the compound of Formula $R^1SnX_3$ is isopropyl tin trichloride, distillation prior to use can provide a reactant which is at least about 99.9% pure.

In one embodiment, the compounds of Formula $R^1SnX_3$ include isopropyl tin trichloride, isopropyl tin tribromide, and isopropyl tin triiodide. In one embodiment, the compound of Formula $R^1SnX_3$ is isopropyl tin trichloride. Reference to isopropyl tin trichloride below will thus apply to isopropyl tin tribromide and isopropyl tin triiodide as well, along with other compounds of Formula $R^1SnX_3$ as defined herein. The compounds of Formula $R^1SnX_3$ may be added in the form of a solution or slurry, depending on the solvent utilized. For example, in hydrocarbon solvents, such as hexanes, this may form a slurry; in ethers such as tetrahydrofuran, these compounds may form a solution.

In the above process, the compound of Formula $R_2NH$ is present in a molar excess relative to the compound of Formula $R^1SnX_3$. In certain embodiments, this molar excess will be at least about 0.15, or at least about 4. In one embodiment, this molar excess can be about 2 to about 10, such as from about 2 to about 8 or about 2 to about 4, relative to the compound of Formula $R^1SnX_3$.

In the above process, non-polar aprotic solvents such as hexane may be utilized. The process can be conducted at reduced temperatures of about −78° C. to about 10° C. The reaction time may be anywhere from 1 to 60 hours at ambient temperature (i.e., from about 17° C. to about 27° C.). The reaction mixture can be filtered and subsequently vacuum distilled to remove the solvent. A non-reactive filter aid such as diatomaceous earth (i.e., celite) can be used, although higher purity products may result without this filter aid due, for example, to the presence metallic species in the filter aid. The crude product can be purified via a short path distillation after filtration of any residual solids.

In one embodiment, the isopropyl tin trichloride is distilled prior to use to remove impurities. For example, the isopropyl tin trichloride may be distilled to provide a reactant which is at least about 99.9% pure.

The lithium dimethylamide may be commercially provided or can be freshly prepared from dimethylamine and an alkyl lithium reagent.

As noted above, the process of the invention makes it possible to synthesize compounds of Formula (I) in very high purity, including with very little di-alkyl impurity present. Accordingly, in another aspect, the invention provides a composition comprising a compound of Formula (I):

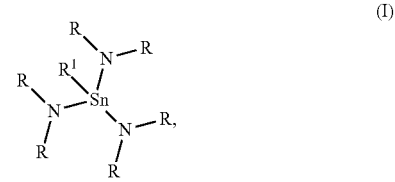

(I)

wherein each R is independently chosen from a $C_1$-$C_5$ alkyl group, and $R^1$ is chosen from a $C_1$-$C_5$ alkyl group, wherein said composition comprises less than about 0.5% by mole, of a compound of Formula (II):

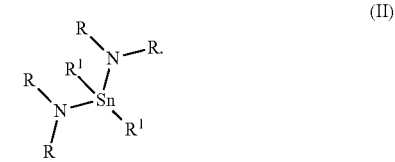

(II)

As a specific embodiment, $R^1$ is chosen from a $C_1$-$C_3$ alkyl group such as a methyl, ethyl, n-propyl, and isopropyl (iPr) group.

In one embodiment, the composition comprising a compound of Formula (I) comprises less than about 0.1% of a compound of Formula (II). In one embodiment, the compound of Formula (II) is bis(dimethylamido)diisopropyl tin, and the compound of Formula (I) is tris(dimethylamido) isopropyl tin.

In another embodiment, the composition comprising a compound of Formula (I) comprises less than about 0.05% of a compound of Formula (II). In one embodiment, the compound of Formula (II) is bis(dimethylamido)diisopropyl tin, and the compound of Formula (I) is tris(dimethylamido) isopropyl tin.

In another embodiment, the composition comprising a compound of Formula (I) comprises less than about 0.04% of a compound of Formula (II). In one embodiment, the compound of Formula (II) is bis(dimethylamido)diisopropyl tin, and the compound of Formula (I) is tris(dimethylamido) isopropyl tin.

In another embodiment, the composition comprising a compound of Formula (I) comprises less than about 0.03% of a compound of Formula (II). In one embodiment, the compound of Formula (II) is bis(dimethylamido)diisopropyl tin, and the compound of Formula (I) is tris(dimethylamido) isopropyl tin.

In another embodiment, the composition comprising a compound of Formula (I) comprises less than about 0.02% of a compound of Formula (II). In one embodiment, the compound of Formula (II) is bis(dimethylamido)diisopropyl tin and the compound of Formula (I) is tris(dimethylamido) isopropyl tin.

As will be seen below in Example L, it is possible to reach a level of purity, when the compound of Formula (I) is tris(dimethylamido)isopropyl tin (i.e., wherein each R is methyl and $R^1$ is isopropyl), such that the presence of the undesired bis(dimethylamido)diisopropyl tin impurity (i.e., Formula (II), wherein each R is methyl, and each $R^1$ is isopropyl) is undetectable by routine $^{119}$Sn NMR analysis, such as utilizing a JEOL ECZ 400 with a residence time in the NMR of about 1 h to about 10 h for quantitative data acquisition.

In the above process, it is believed that a molar excess of a compound of Formula $R_2NH$ compared to the compound of Formula $R^1SnX_3$ affords an in situ intermediate Lewis base adduct having Formula (A):

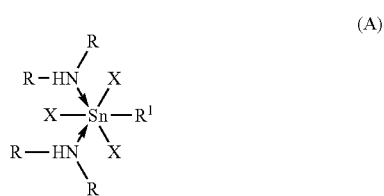

(A)

wherein each R is independently chosen from a $C_1$-$C_5$ alkyl group, $R^1$ is chosen from a $C_1$-$C_5$ alkyl group, and X is chosen from Cl, I, or Br. For example, each R and $R^1$ may be chosen from a $C_1$-$C_5$ alkyl group, such as a methyl, ethyl, propyl, isopropyl, n-butyl, t-butyl, sec-butyl group. Thus, an embodiment of the invention is a process for preparing a compound of Formula (I) from a compound of Formula (A), which is formed by reaction of a compound of Formula $R_2NH$ and a compound of Formula $R^1SnX_3$ and then reacts with a compound of Formula $Li(R)_2N$. For this embodiment, the compound of Formula $R_2NH$ is in excess of the compound of Formula $R^1SnX_3$.

In a specific example of the above process, it is believed that a molar excess of dimethylamine compared to isopropyl tin trichloride, which in one embodiment is about 0.15 to about 10, affords an in situ intermediate Lewis base adduct having Formula (A-a):

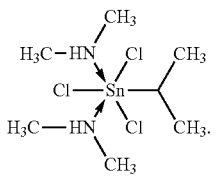

(A-a)

In a similar way, a molar excess of dimethyl amine compared to ethyl tin trichloride affords an in situ Lewis base adduct having Formula (A-d):

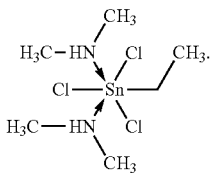

(A-d)

For example, when a molar excess of dimethylamine is utilized in the reaction, the formation of the undesired dialkyl by-product, bis(dimethylamido)diisopropyl tin, has been observed to be greatly diminished. In this regard, reproduction of Example 1 of WO2017/066319 as shown in Comparative Example 1 below, resulted in a product mixture of the desired tris(dimethylamido)isopropyl tin along with approximately 1.6 mole percent (as determined by $^{119}$Sn NMR integration) of the undesired bis(dimethylamido)diisopropyl tin. While not wishing to be bound by any particular mechanism, it is believed that the excess dimethylamine forms the corresponding Lewis base adduct in situ, which upon reaction with the lithium dimethylamide, advantageously improves the selectivity of the reaction and thus leads to the greatly improved purity of the desired compound of Formula (I), such as tris(dimethylamido)isopropyl tin. Additionally, when care is taken to utilize recently-prepared or purified reactants, this effect is enhanced.

As further support, Lewis base adduct (A-a) was prepared, isolated and crystallized:

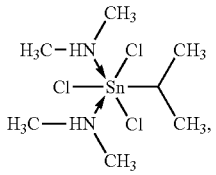

(A-a)

Reaction of adduct (A-a) with lithium dimethylamide afforded tris(dimethylamido)isopropyl tin in high yield and outstanding selectivity for the mono-isopropyl species, at levels of contamination (with diisopropyl species) of as low as about 0.03%, 0.02%, 0.01%, or 0.001% and can be undetectable by routine $^{119}$Sn NMR analysis, such as utilizing a JEOL ECZ 400 with a residence time in the NMR of about 1 h to about 10 h for quantitative data acquisition. Thus, in a further aspect, the invention provides the compound of Formula (A), which is useful as an intermediate in the synthesis of Formula (I).

In one embodiment, the compound of Formula (A) is added as a slurry in hydrocarbon solvent to a slurry of lithium dimethylamide in hydrocarbon solvent.

In one embodiment, the lithium dimethylamide is freshly prepared from dimethylamine and an alkyl lithium.

In similar fashion, the corresponding iodo substituted tin compounds of Formula (A-b) and bromo substituted tin compounds of Formula (A-c) can be prepared and isolated:

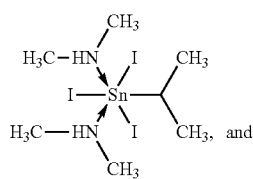

(A-b)

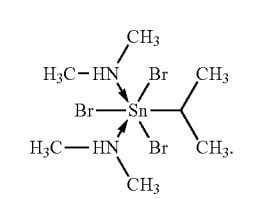

(A-c)

Thus, the compounds of Formula (A-a), (A-b), and (A-c) would also be useful as intermediates in the synthesis of high-purity tris(dimethylamido)isopropyl tin and form another aspect of the invention.

Accordingly, in a further aspect, the invention provides a process for preparing a composition comprising a compound of Formula (I-a):

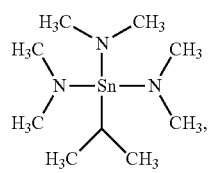

(I-a)

which comprises contacting a compound of Formula (A-a):

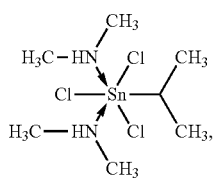

(A-a)

with lithium dimethylamide. Furthermore, the invention also provides a process for preparing a composition comprising a compound of Formula (I-d):

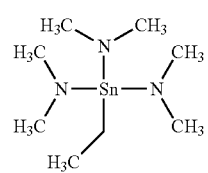

(I-d)

which comprises contacting a compound of Formula (A-d):

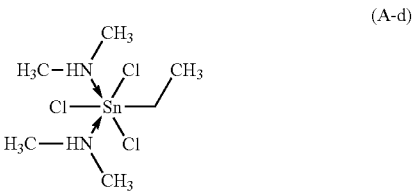

(A-d)

with lithium dimethylamide.

In the processes of the invention, the lithium dimethylamide will either be a solution or a slurry, depending on the solvent or medium utilized; for example, with tetrahydrofuran, the lithium dimethylamide will generally be a solution and in hydrocarbons, it would generally be in the form of a slurry. In one embodiment, the compound of Formula (A-a) is in a slurry with a hydrocarbon solvent, such as hexane. In another embodiment, the compound of Formula (A-a) is dissolved in an ether solvent, such as tetrahydrofuran.

In general, the lithium dimethylamide is present in a molar excess, i.e., of at least about 3 molar equivalents of lithium dimethylamide relative to 1 molar equivalent of the compound of Formula (A-a) in order to fully react with the three chlorine atoms on the compound of Formula (A-a). In one embodiment, about 3 to 3.2 equivalents of lithium dimethylamide is utilized, relative to the compound of Formula (A). When preparing the lithium dimethylamide, it may be advantageous to have a molar excess of dimethyl amine present, for example at least about 1.05 molar equivalents of dimethylamine (relative to the alkyl lithium starting material, for example n-butyl lithium).

In one embodiment, the composition comprises less than about 0.5% mole percent of impurities, wherein said impurities are comprised of bis(dimethylamido)diisopropyl tin.

The precursors for the preparation of the compounds of Formula (A-b) and (A-c) can be prepared from the corresponding isopropyl trihalo tin compounds according to the following scheme:

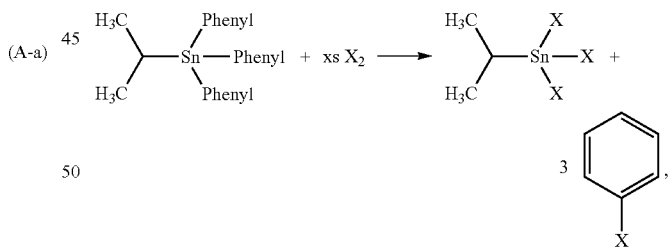

wherein X is bromo or iodo. Instead of a molar excess of iodine or bromine (e.g., approximately 3.5), mono iodo chloride or mono iodo bromide can be utilized, as described, for example in (i) Mesubi, M. A.; Afolabi, M. O.; Falase, K. O. Halogen Cleavage of Cyanomethyltriphenylstannane. *Inorg. Nucl. Chem. Lett.* 1976, 12, 469-474, https://doi.org/10.1016/0020-1650(76)80148-1; (ii) Bullard, R. H.; Robinson, W. B. Methylphenylstannanes. *J. Am. Chem. Soc.* 1927, 49, 1368-1373, https://doi.org/10.1021/ja01404a030; (iii) Shekouhian, M. Hassan. Organotin Compound—a Mechanistic Approach for Their Synthesis. *J. Recent Adv. Appl. Sci.* 1988, 3, 483-486; (iv) Bhattacharya, S. N.; Husain, Ishrat. Reactions of Tin-Naphthyl Bond with Halogens and Pseudohalogens. *Indian J. Chem. Sect. Inorg. Phys. Theor. Anal.* 1981, 20A, 1119-1121; and (v) Bhattacharya, S. N.; Raj, P.; Singh, Meenu. Studies on Synthetic and Structural Aspects of Some New Unsymmetric and Asymmetric Organotin(IV) Halides, Pseudohalides and Carboxylates and Their Complex Anions. *Indian J. Chem. Sect. Inorg. Phys. Theor. Anal.* 1979, 18A, 231-235.)

Thus, as with the corresponding isopropyl tin trichloride, the compounds of Formula

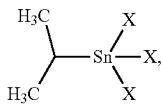

wherein X is bromo or iodo, can be contacted with 2.0, 4.0, or up to 6.0 molar equivalents of dimethylamine, to ensure the formation of the Lewis base adduct (such as the compounds of Formulae (A-b) and (A-c)), followed by removal of solvent in vacuo to afford the compounds in crystalline form. Accordingly, in a further embodiment, the invention provides the compounds of Formulae (A-a), (A-b), and (A-c) in crystalline form. In one embodiment, the crystalline form of the compound of Formula (A-a) is as set forth in FIG. 1.

In a further aspect, the invention provides a process for preparing compounds of Formula $R^1SnX_3$, wherein X is chloro or bromo and $R^1$ is chosen from a $C_1$-$C_5$ alkyl group, by reacting a compound of the Formula $R^1SnR^4_3$ with a mono iodo chloride or bromide respectively, wherein $R^4$ is chosen from aryl, $C_2$-$C_8$ alkenyl, and $C_2$-$C_8$ alkynyl, and thus providing the corresponding isopropyl tin trihalide and iodobenzene. In this regard, aryl includes aromatic carbocyclic rings such as phenyl and napthyl, etc., optionally substituted by $C_1$-$C_6$ alkyl, halo, nitro, cyano, $C_1$-$C_6$ alkoxy, $C_1$-$C_6$ alkylamino, and $C_1$-$C_6$ dialkylamino. The $C_2$-$C_8$ alkenyl and $C_2$-$C_8$ alkynyl groups are understood to denote two to eight carbon hydrocarbons with at least one double bond or triple bond, respectively, and the point of attachment may be to the carbon with the double or triple bond, or one of the other carbons in the chain.

In another aspect, the invention provides a process for preparing a compound of Formula $R^1SnX_3$, wherein X is chloro, bromo, or iodo and $R^1$ is chosen from a $C_1$-$C_5$ alkyl group, which comprises contacting a compound of Formula $R^1SnR^2_3$ with a compound of the Formula $SnX_4$, wherein $R^2$ is chosen from aryl or $C_2$-$C_8$ alkenyl.

EXAMPLES

Example 1—Synthesis and Isolation of the Bis-Dimethylamine Lewis Base Adduct of Isopropyl Tin Trichloride A 100 mL round bottom flask with a gas/vac inlet sidearm adapter was equipped with a 7 mm tubing adapter. The flask was charged with isopropyl tin trichloride (11.0 g, 41.02 mmol) followed by 60 mL anhydrous hexanes, sealed, and transferred out of the glovebox. The flask was cooled in an ice bath, and dimethylamine (9.00 g, 199.6 mmol) was slowly bubbled into the solution over 48 minutes via ¼" PFA tubing. When the addition was complete, a white solid precipitate was observed. The mixture was allowed to warm to ambient temperature and stirred for 2 h; it was then filtered and dried in-vacuo to give 12.88 g (86.9%) of the desired product as a white solid. Slow evaporation of hexanes from the filtrates gave colorless crystals of iPrSnCl$_3$(HN(CH$_3$)$_2$)$_2$.

$^1$H NMR (400 MHz, CDCl$_3$ 298K): δ 3.41 (s, 2H), 2.79 (s, 12H), 2.29 (sept, 1H), 1.45 (d, 6H) ppm. $^{13}$C {$^1$H} NMR (100 MHz, CDCl$_3$ 289K): δ 45.36, 39.60, 22.38 ppm. $^{119}${$^1$H} NMR (149 MHz CDCl$_3$, 298K): δ—405.8 ppm.

Example 2—Synthesis and Isolation of the Bis-Dimethylamine Lewis Base Adduct of Isopropyl Tin Triiodiide A 100 mL round bottom flask with a gas/vac inlet sidearm adapter equipped with a 7 mm tubing adapter can be charged with isopropyl tin triiodide (10.0 g, 18.43 mmol) followed by 60 mL anhydrous hexanes, sealed, and transferred out of a glovebox. The flask can be cooled in an ice bath, and dimethylamine (2.50 g, 55.3 mmol) can be slowly bubbled into the solution via ¼" PFA tubing. When the addition is complete, a white solid precipitate would be observed. The mixture can then be allowed to warm to ambient temperature and stirred for 2 h, filtered and dried in-vacuo to give the expected desired product.

Example 3—Synthesis and Isolation of the Bis-Dimethylamine Lewis Base Adduct of Isopropyl Tin Tribromide A 100 mL round bottom flask with a gas/vac inlet sidearm adapter equipped with a 7 mm tubing adapter can be charged with isopropyl tin tribromide (10.0 g, 24.90 mmol) followed by 60 mL anhydrous hexanes, sealed, and transferred out of the glovebox. The flask can be cooled in an ice bath, and dimethylamine (3.37 g, 74.7 mmol) can be slowly bubbled into the solution via ¼" PFA tubing. When the addition is complete, a white solid precipitate would be observed. The mixture can then be allowed to warm to ambient temperature and stirred for 2 h, filtered and dried in-vacuo to give the expected desired product.

Example 4

In an inert atmosphere glovebox a 100 mL round bottom flask with a thermowell was equipped with PTFE boiling chips, 50.0 g (127.1 mmol) isopropyltriphenyltin and 99.3 g (381.2 mmol) tin(IV)chloride. A large exotherm was noted, and when the mixture had cooled to ambient temperature, the flask was attached to a distillation assembly that consisted of a 12" silvered, vacuum jacketed column packed with 0.16 int stainless steel Pro-Pak®, a variable reflux distillation head with a pressure equalizing arm, and a 100 mL round bottom receiving flask with a gas/vacuum inlet sidearm. The reaction mixture was heated to 120° C. for 3 hours and then distilled at 100 mtorr with the head temperature ranging from 29 to 45° C. with an average head temperature of 36° C. A first fraction consisting of 8.24 g (99.9% pure by $^{119}$Sn NMR) and a second fraction consisting of 24.6 g (99.6% pure by $^{119}$Sn NMR) were collected for a combined yield of 32.8 g (96%, 99.7% pure).

$^1$H NMR (400 MHz, CDCl$_3$, 298K): δ 1.61 (sept, 1H) 1.38 (d, 6H) ppm. $^{13}$C {$^1$H} NMR (100 MHz, CDCl$_3$ 289K): δ 40.91, 19.68 ppm. $^{119}$Sn {$^1$H} NMR (149 MHz Neat, 298K): δ—12.3 ppm.

Examples A through I—Synthesis of Tris(Dimethylamido)Isopropyl Tin

The title compound was synthesized according to the following procedures with Table 1A and 1B below outlining multiple experiments where certain parameters were varied.

Procedure for Examples A and B

A 100 mL round bottom flask with a gas/vacuum inlet sidearm was charged with lithium dimethylamide (4.26 g, 83.5 mmol) and 36 mL hexane. A 5 mL syringe with a stopcock valve was charged with isopropyltin trichloride (7.00 g, 26.1 mmol) and any additives listed in Table 1A below. The slurry of lithium dimethylamide was cooled to −65° C., and the isopropyltin trichloride was added in a dropwise fashion over 10 minutes. Only a very small exotherm was observed, and the mixture was allowed to warm to ambient temperature. The reaction mixture was allowed to stir for 36 hours at ambient temperature and was then filtered through a celite bed and stripped of all volatiles in-vacuo. The crude product was purified via a short path distillation under reduced pressure to give iPrSn(NMe$_2$)$_3$ in 55% yield with 0.8% iPr$_2$Sn(NMe$_2$)$_2$ impurity as determined by $^{119}$Sn NMR.

$^1$H NMR (400 MHz, d$_6$-benzene, 298K): δ 2.83 (s, 18H), 1.63 (sept, 1H), 1.27 (d, 6H) ppm. $^{13}$C {$^1$H} NMR (100 MHz, d$_6$-benzene, δ 289K): δ 43.6, 21.2, 14.9 ppm. $^{119}$Sn {$^1$H} NMR (149 MHz Neat, 298K): δ−64.3 ppm.

Procedure for Examples C, D, F, and H

A 250 mL 3-neck round bottom flask equipped with a PTFE coated stir egg was charged with butyllithium (23.7 mL, 59.4 mmol), diluted with 25 mL anhydrous hexanes, and fitted with a 7 mm tubing adapter, a 7 mm valved sidearm tubing adapter, and gas/vac inlet adapter. The flask was cooled down to 2° C. in an ice bath, a condenser was fitted between the flask and gas/vac inlet adapter, and dimethylamine (6.20 g, 138 mmol, 6.94 eq) was slowly bubbled in via ¼" PFA tubing. The reaction mixture was cooled down to approximately −10° C., and a solution of isopropyltintrichloride (5.31 g, 19.8 mmol) diluted to 29 mL with hexanes was added slowly via syringe pump over 47 minutes (0.61 mL/min). The reaction mixture was then allowed to warm to ambient temperature over 20 minutes and stirred for 1 hour at ambient temperature. The reaction mixture was transferred into the glovebox and filtered over a bed of celite through a medium porosity fitted funnel. The residue was washed with 10 mL anhydrous hexanes and the solvent was stripped from the filtrates under full vacuum. The crude yield was 5.427 g (93%) with no detectable amount of iPr$_2$Sn(NMe$_2$)$_2$ by $^{119}$Sn NMR of a neat sample. The crude product was distilled under reduced pressure (50 mtorr at pump) to give 3.929 g (67%) of colorless product with 0.02% iPr$_2$Sn(NMe$_2$)$_2$ by $^{119}$Sn NMR.

Procedure for Example E

A 100 mL round bottom flask equipped with a PTFE coated stir egg was charged with butyllithium (23.0 mL, 57.4 mmol), diluted with 25 mL anhydrous hexanes and fitted with a valved sidearm tubing adapter. The flask was cooled down to 2° C. in an ice bath, and dimethylamine (5.10 g, 113 mmol, 5.72 eq) was slowly bubbled in via ¼" PTFE tubing at a rate slow enough to keep the reaction temperature under 20° C. The reaction mixture was then allowed to stir overnight at ambient temperature and during this time all the volatiles present in the reaction mixture evaporated out via a nitrogen bubbler connected to the flask. The reaction mixture was diluted with 50 mL of hexanes, cooled in a brine bath to about −10° C. and a solution of isopropyltintrichloride (5.30 g, 19.7 mmol) diluted to 26 mL with hexanes was added slowly via syringe pump over 43 minutes (0.605 mL/min). The reaction mixture was then allowed to warm slowly to ambient temperature, stirred for 30 minutes, and then transferred into the glovebox and stirred for 60 h. The reaction mixture was filtered over a bed of celite and washed with 15 mL of hexanes. The filtrates were stripped of volatiles under reduced pressure to give 4.73 g crude (82%) off-white oil which contained 1.05% iPr$_2$Sn(NMe$_2$)$_2$ as determined by $^{119}$Sn NMR of a neat sample. The material was then distilled under reduced pressure in a short path distillation apparatus to give 4.019 g (69%) of colorless oil as the product with 1.45% iPr$_2$Sn (NMe$_2$)$_2$ by $^{119}$Sn NMR of a neat sample.

Procedure for Example G

A 250 mL 3-neck round bottom flask equipped with a PTFE coated stir egg was charged with lithium dimethylamide (3.38 g, 63.3 mmol), diluted with 50 mL anhydrous hexanes and fitted with two stoppers and a valved sidearm 7 mm tubing adapter. The flask was transferred out to the hood where, under nitrogen purge, the stoppers were swapped out for a PTFE thermocouple adapter with PTFE coated thermocouple and a condenser with a gas/vac inlet valve on top. The flask was cooled down to about −10° C. in an icy brine bath and dimethylamine (2.9 g, 64 mmol, 3.24 eq) was slowly bubbled in via ¼" PTFE tubing over a 16-minute span (0.18 g/min). The reaction mixture (still at approximately −10° C.) was treated with a solution of isopropyl tin trichloride (5.32 g, 19.8 mmol) diluted to 23 mL with anhydrous hexanes over a 46 minute span. This was then allowed to slowly warm to ambient temperature overnight. The reaction mixture was filtered over a celite bed and washed with 15 mL hexanes. The filtrates were stripped of volatiles under reduced pressure to give 4.86 g crude (84%) off-white oil which contained 0.5% iPr$_2$Sn(NMe$_2$)$_2$ as determined by $^{119}$Sn NMR of a neat sample. The material was then distilled under reduced pressure in a short path distillation apparatus to give 3.277 g (56%) of colorless oil as the product with 0.75% iPr$_2$Sn(NMe$_2$)$_2$ by $^{119}$Sn NMR of a neat sample.

Procedure for Example I

A 250 mL 3-neck round bottom flask equipped with a PTFE coated stir egg was charged with butyllithium (20.0 mL, 50.0 mmol), diluted with 25 mL anhydrous hexanes and fitted with a 7 mm tubing adapter, a 7 mm valved sidearm tubing adapter, and gas/vac inlet adapter. The flask was cooled down to −4° C. in a brine bath, and dimethylamine (5.11 g, 113 mmol, 6.77 eq) was slowly bubbled in via ¼" PTFE tubing over a 26-minute span (approximately 0.20 g/min). The reaction mixture was then stripped of volatiles under reduced pressure while keeping the reaction mixture below 8° C. When the reaction mixture had been concentrated down to a thick paste, the reaction mixture was diluted with 50 mL of anhydrous hexanes and cooled down to about −10° C. in a brine bath to prepare for the addition of the iPrSnCl$_3$(HNMe$_2$)$_2$ slurry. A 100 mL round bottom flask with a gas/vac inlet sidearm and a 7 mm tubing adapter was charged with iPrSnCl$_3$(HNMe$_2$)$_2$ (6.00 g, 16.7 mmol) in 30 mL hexanes and equipped with a stir egg. The two flasks were connected via ¼" PTFE tubing, and the iPrSnCl$_3$ (HNMe$_2$)$_2$ slurry was transferred over in two aliquots. The majority of the residual white solid remaining in the 100 mL flask was rinsed over with an additional 25 mL anhydrous hexanes and an aliquot of the reaction mixture was transferred to and from the 100 mL flask to complete the rinse process and ensure complete mixing. The reaction mixture was then allowed to warm up slowly overnight in the brine bath. The reaction mixture which was a slurry of white solid in colorless solution was transferred into the glovebox, filtered over a 1 cm bed of celite, and rinsed with 10 mL anhydrous hexanes. The solvent and other volatiles were removed from the filtrates in-vacuo and then massed, yielding 4.310 g crude product (87%) which contained a sub-detection limit amount of iPr$_2$Sn(NMe$_2$)$_2$ as determined by $^{119}$Sn NMR of a neat sample. The material was then distilled under reduced pressure in a short path distillation apparatus to give 3.541 g (72% yield) of colorless oil as the product with 0.03% iPr$_2$Sn(NMe$_2$)$_2$ by 119Sn NMR of a neat sample.

Example K—25.0 g Scale Synthesis of Tris(Dimethylamido)Isopropyl Tin (Magnetically Stirred)

A 500 mL 3-neck round bottom flask equipped with a PTFE coated stir egg was charged with butyllithium (107.5 mL, 293.6 mmol) which was diluted with hexane (24.51 mL, 186.4 mmol). The flask was fitted with a stopper, gas/vac inlet adapter, and a valved Chemglass 7 mm tubing adapter. The flask was cooled in a brine bath, and a nitrogen flushed condenser was placed unto the flask in the place of the gas/vac inlet adapter. Dimethylamine (30.03 g, 0.661 moles, 7.14 eq) was then slowly bubbled into the reaction mixture. The resulting slurry was cooled down to approximately −9° C., and a solution of trichloro(propan-2-yl)stannane (25.00 g, 93.23 mmol) in hexane (122.6 mL, 932.3 mmol) (total volume 135 mL) was added via 250 mL addition funnel over 51 minutes. When the addition was complete, the reaction mixture was allowed to warm to ambient temperature and stir for 16 hours. The reaction mixture was then filtered over a 2 cm celite bed on a medium porosity filter funnel. The filter cake was washed with hexane (24.51 mL, 186.4 mmol) and the combined filtrates were stripped of solvent under reduced pressure (50 mtorr at pump). The yellow oil was transferred to a pre-tared vial and yielded a mass of 19.435 g (70.9%) crude product. The crude product was distilled in a short path distillation apparatus under full vacuum to give 16.945 g of slightly yellow oil (61.8% yield). The distilled product was analyzed by $^{119}$Sn, $^1$H, and $^{13}$C NMR which indicated that 0.07% iPr$_2$Sn(NMe$_2$)$_2$ by $^{119}$Sn NMR of a neat sample.

Example L—125.0 g Scale Synthesis of Tris(Dimethylamido)Isopropyl Tin (Mechanically Stirred)

A 3-liter round bottom flask with a mechanical stirrer assembly was charged with butyllithium (540.0 mL, 1474 mmol) and hexane (525 mL) and then cooled in a brine bath. Dimethylamine (120.3 g, 2.67 moles, 5.72 eq) was bubbled through the cold butyllithium solution over 273 minutes to form a thick white slurry. To this slurry, still cooled in a brine bath, a solution of isopropyltin trichloride (125.00 g, 466.1 mmol) in hexane (610 mL) was added over 52 minutes. The reaction mixture was then filtered over a 2 cm bed of celite in a medium porosity filter funnel into a 2 L round bottom flask and the residual salts were washed with hexane (125 mL). The combined filtrates were then stripped of solvent and other volatiles in-vacuo to give 126.8 g (92.6%) crude product. The crude product was then filtered through a medium porosity polyethylene filter funnel to remove the majority of the solids present. The filtered product was transferred into a clean 250 mL flask and distilled at 100 mtorr to give 116.66 g (85.1%) distilled product with no detectable amount of iPr$_2$Sn(NMe$_2$)$_2$ by $^{119}$Sn NMR of a neat sample.

Example M

A 3-liter round bottom flask with a mechanical stirrer assembly was charged with 2.74 M butyllithium (400 mL, 1096 mmol) and hexane (400 mL) and then cooled in an isopropanol/ice bath. Dimethylamine (66.3 g, 4.224 moles) was bubbled through the cold butyllithium solution to form a thick white slurry. The lithium dimethylamide reaction mixture was then diluted with 871 mL anhydrous tetrahydrofuran to form a less viscous but still inhomogeneous reaction mixture. To this cooled slurry was added additional dimethylamine (66.0 g, 4.204 moles) to give a homogeneous solution. To this solution, still cooled in an isopropanol/water bath, was added a 750 mL solution of isopropyltin trichloride bis(dimethylamine) (125.00 g, 348 mmol) in anhydrous tetrahydrofuran over 199 minutes with the internal reaction temperature between −18° C. and −13° C. The reaction mixture was allowed to slowly warm to ambient temperature over 18 hours. The reaction mixture was stripped of solvent and other volatiles in-vacuo, diluted with 250 mL anhydrous hexanes, filtered through a medium porosity fritted funnel, then washed with an additional 250 mL aliquot of anhydrous hexanes. The combined filtrates were then stripped of hexanes and other volatiles in-vacuo to give 101.1 g (99%) crude product. The crude product was distilled at 70-100 mtorr to give 88.8 g (87%) distilled product with no detectable amount of iPr$_2$Sn(NMe$_2$)$_2$ by $^{119}$Sn NMR of a neat sample.

TABLE 1A

Process variables for tris(dimethylamido)isopropyl tin synthesis

| Ex | LiNMe$_2$ Source | Equivs of DMA* to Tin starting material | Tin Starting Material*** | Xs equivs of dimethyl-amine to tin starting material | Equivs of LiN(CH$_3$)$_2$ to tin starting material | LiN(CH$_3$)$_2$ synthesis reaction time (hours) | Tin starting material addition rate (mL/min) | Tin starting material addition min temp (° C.) |
|---|---|---|---|---|---|---|---|---|
| A | Comm | 0 | iPrSnCl$_3$** | 0 | 3.20 | NA | 0.40 | −65 |
| B | Comm | 0 | iPrSnCl$_3$ | 0 | 2.97 | NA | 0.67 | −10 |
| C | Synth. | 6.51 | iPrSnCl$_3$ | 3.14 | 3.37 | 16 | 0.56 | −65 |
| D | Synth. | 4.63 | iPrSnCl$_3$ | 1.46 | 3.18 | 17 | 0.56 | −67 |
| E | Synth. | 5.72 | iPrSnCl$_3$ | 2.55 | 3.18 | 16 | 0.60 | −10 |
| F | Synth. | 6.70 | iPrSnCl$_3$ | 3.54 | 3.16 | 0.25 | 0.54 | −13 |
| G | Comm | 3.24 | iPrSnCl$_3$ | 3.24 | 3.34 | NA | 0.50 | −12 |

TABLE 1A-continued

Process variables for tris(dimethylamido)isopropyl tin synthesis

| Ex | LiNMe$_2$ Source | Equivs of DMA* to Tin starting material | Tin Starting Material*** | Xs equivs of dimethyl-amine to tin starting material | Equivs of LiN(CH$_3$)$_2$ to tin starting material | LiN(CH$_3$)$_2$ synthesis reaction time (hours) | Tin starting material addition rate (mL/min) | Tin starting material addition min temp (° C.) |
|---|---|---|---|---|---|---|---|---|
| H | Synth. | 6.94 | iPrSnCl$_3$ | 3.77 | 3.17 | 0.25 | 0.62 | −10 |
| I | Synth. | 6.77***** | iPrSnCl$_3$·(HN(CH$_3$)$_2$)$_2$ | 3.51 | 3.26 | 0.5 | NA | −9.8 |
| J | Comm | 0 | iPrSnCl$_3$ | 0 | 3.19 | NA | 0.02 | −73 |
| K | Synth. | 7.14 | iPrSnCl$_3$ | 4.00 | 3.15 | 0.35 | 2.65 | −9.4 |
| L | Synth. | 5.72 | iPrSnCl$_3$ | 2.56 | 3.16 | 0.40 | 11.92 | −8.8 |

*DMA = dimethylamine
**isopropyl tin trichloride
***In the case of Examples A through G, the tin starting material was prepared via iPr$_4$Sn/SnCl$_4$ redistribution reaction; in the case of example H, the tin starting material was prepared via iPrSn(phenyl)$_3$ redistribution reaction; and in the case of Example I, the tin starting material was prepared via iPrSn(phenyl)$_3$ redistribution, followed by reaction with excess dimethylamine and isolation of the Lewis base adduct of formula (A).
****In the case of Examples A, B, and G, the LiNMe2 was purchased commercially as a dry solid and used as received. In Example E, the LiNMe2 was synthesized but all volatiles including any excess dimethylamine were evaporated away as it sat over a 16-hour period.
*****In Example I, the volatiles (excess DMA and hexanes) were stripped away in vacuo so that no excess dimethylamine remained.
******In Example B, triethylamine was a synthesis additive in the preparation of the isopropyl(tris)dimethylamine tin; in all other examples, no synthesis additive was used.

TABLE 1B

Process Variables (continued)

| Ex | Tin starting material addition min temp (° C.) | Tin starting material addition max temp (° C.) | iPrSn(N(CH$_3$)$_2$)$_3$ synthesis reaction time (hours) | Distilled (% yield) | Distilled iPrSn(N(CH$_3$)$_2$)$_3$ purity by $^{119}$Sn NMR | Distilled iPrSn(N(CH$_3$)$_2$)$_3$ % of iPr$_2$Sn(N(CH$_3$)$_2$ impurity by $^{119}$Sn NMR |
|---|---|---|---|---|---|---|
| A | −65 | 23 | 36 | 55 | 97.17 | 0.77 |
| B | −10 | 23 | 96 | NA | NA | NA |
| C | −65 | −65 | 36 | 41 | 99.6 | 0.07 |
| D | −67 | −65 | 24 | 75 | 99.6 | 0.17 |
| E | −10 | 0 | 60 | 69 | 97.8 | 1.45 |
| F | −13 | −2 | 16 | 78 | 99.7 | 0.1 |
| G | −12 | −8 | 22 | 56 | 98.15 | 0.75 |
| H | −10 | −4.9 | 1 | 67 | 99.4 | 0.02 |
| I | −9.8 | 4.7 | 18 | 72 | 99.64 | 0.03 |
| J | −73 | −67.4 | 16 | 64 | 97.35 | 1.62 |
| K | −9.4 | 1.3 | 16 | 61.8 | 99.69 | 0.07 |
| L | −8.8 | 0.9 | 19 | 85.1 | 99.94 | 0.00 |

Example J (Comparative Example Reproduction of Example 1 of WO 2017/066319)

A 100 mL round bottom flask was charged with lithium dimethylamide (3.03 g, 59.5 mmol, Sigma Aldrich) and 25 mL hexane. The flask was equipped with a PTFE coated stir egg and a thermocouple/adapter, then cooled in a dry ice/isopropanol bath (−73° C. internal temperature). To this slurry was added trichloro(propan-2-yl)stannane (5.00 g, 18.6 mmol) via syringe over 122 minutes via syringe pump. The reaction mixture was then allowed to warm up to ambient temperature and stir for 16 h. The reaction mixture was filtered over a celite bed on a medium porosity glass frit. The filter cake was washed with 25 mL anhydrous hexanes and the filtrates stripped of volatiles under full vacuum. The crude product was distilled under full vacuum to give 3.52 g (64.4%) of a colorless oil. The $^{119}$Sn NMR spectrum indicated that roughly 1.6% iPr$_2$Sn(NMe$_2$)$_2$ was present.

Preparation 1—Synthesis of Isopropyl-SnCl$_3$ from Isopropyl-Sn(Phenyl)$_3$ and SnCl$_4$ A 2.3-neck distillation flask with a thermocouple was charged with 753 g (1.915 moles) isopropyltriphenyl tin and fitted to an 8" vigreaux column distillation assembly. A 1 L flask was fitted to the distillation outlet. The flask containing the isopropyltriphenyltin was charged with 1.000 g tin(IV) chloride (3.838 moles, 2 eq., Sigma Aldrich) over a span of approximately two hours with a moderate exotherm observed. The isopropyl tin trichloride was then distilled at 1 torr between 65° C. and 75° C. with the head temperature rising sharply to about 100° C. at the conclusion of the distillation. The product (588 g) was found to be a mixture of PhSnCl$_3$ (15 mole %) and iPrSnCl$_3$ (85 mole %) with the distillation pot material consisting of 55 mole % Ph$_2$SnCl$_2$ and 45 mole % PhSnCl$_3$ by $^{119}$Sn NMR. The yield of iPrSnCl$_3$ calculated from the relative NMR integrations was 493 g (96% yield), The mixture of iPrSnCl$_3$ and PhSnCl$_3$ was further distilled using a 1' column packed with stainless steel 0.16 in$^2$ Pro-Pak® at 50-100 mtorr with a head temperature of 40-43° C. to give 461 g (90%) iPrSnCl$_3$ with 99.9% purity by $^{119}$Sn NMR.

$^1$H NMR (400 MHz, CDCl$_3$, 298K): d 1.61 (sept, 1H), 1.38 (d, 6H) ppm. $^{13}$C {$^1$H} NMR (100 MHz, CDCl$_3$ 289K): d 40.9, 19.7 ppm. $^{119}$Sn {$^1$H} NMR (149 MHz CDCl$_3$, 298K): d –5.9 ppm.

Preparation 2—Synthesis of Isopropyl-SnCl$_3$ from (Phenyl)$_3$Sn-Isopropyl and ICl A 100 mL round bottom flask was equipped with a PTFE coated stir egg, charged with isopropyltriphenyl tin (10.00 g, 25.43 mmol), 50 mL anhydrous hexanes and iodine monochloride (12.42 g, 76.54 mmol) was added in a dropwise fashion with stirring. The temperature rose from 22° C. to 71° C. over the course of the 10 minute addition. The reaction mixture was then allowed to stir 18 h at ambient temperature. The $^{119}$Sn NMR of a reaction aliquot indicated that a small amount of iPrSnPhCl$_2$ was present. The reaction mixture was treated with iodine monochloride (2.063 g, 12.71 mmol) (an additional 0.5 eq) and then allowed to stir at ambient temperature for 30 minutes. The solvent was then removed under a 10 torr vacuum to give crude product (22.439 g, a mixture of the desired product and iodobenzene). The product was then distilled using a 6" $^{14}\!/_{20}$ distillation column packed with stainless steel 0.16 in$^2$ Pro-Pak® to give three fractions: Fraction 1-8.86 g, 8.4 mole % iPrSnCl$_3$, Fraction 2-7.08 g, 36.9 mole % iPrSnCl$_3$, Fraction 3-4.86 g, 93.8 mole % iPrSnCl$_3$. Overall, the recovery of the iPrSnCl$_3$ was quantitative.

Preparation 3—Synthesis of IsopropylSnI$_3$ from Ph$_3$Sn-Isopropyl and I$_2$

A 40 m vial was charged with isopropyl triphenyltin (5.00 g, 12.7 mmol) and 20 mL of toluene. Iodine (10.2 g, 40.0 mmol) was slowly added in several portions with an exotherm observed after each addition. The resulting deep red mixture was then heated 16 h at 90° C. The resulting solution was then distilled in-vacuo in a short path apparatus, first to remove the iodobenzene by-product, and then to distill the product (100-105° C. head temp, 200-500 mtorr) as a yellow oil in 94% yield.

$^1$H NMR (400 MHz, benzene-d$_6$, 298K): d 1.78 (sept, 1H), 0.61 (d, 6H) ppm. $^{13}$C {$^1$H} NMR (100 MHz, benzene-d$_6$, 289K): d 37.6, 19.8 ppm. $^{119}$Sn{$^1$H} NMR (149 MHz benzene-d$_6$, 298K): d—434 ppm.

EtSnCl$_3$—Synthesis and Purification

Ph$_3$SnEt (637.8 g, 1.68 mol) was loaded into a 4-neck 2 L roundbottom flask equipped with a magnetic stir bar, thermocouple, and nitrogen inlet adapter. In a nitrogen-filled glovebox, SnCl$_4$ (916 g, 3.52 mol) was placed in a 500 mL addition funnel, which was then removed from the glovebox and attached to the 2 L roundbottom flask. The apparatus was placed under N$_2$, and the SnCl$_4$ was added slowly over 8 hours directly to the solid Ph$_3$SnEt. The reaction mixture was heated to 115° C. for 1 hour and then distilled using a jacketed 8" vigreaux distillation column at 1 torr between 67° C. and 69° C. A 2-3 mL forecut was collected and the distillation was stopped when the head temperature reached 78° C. A second distillation was carried out using an 8" column packed with glass raschig rings at 1 torr with a head temperature of about 64° C. to give EtSnCl$_3$ as a colorless liquid (327.16 g, 108 mol, 76.7% yield) in >99.0% purity. $^1$H-NMR (400 MHz, C$_6$D$_6$, 298K): 1.43 (t, 3H); 2.27 (q, 2H) ppm; $^{119}$Sn NMR (149 MHz, 298K): 2.03 ppm.

EtSnCl$_3$(HNMe$_2$)$_2$—Synthesis and Characterization

A 5 L 3-neck jacketed flask equipped with an overhead stirrer, gas inlet adapter, and thermocouple was brought into a nitrogen-filled glovebox. EtSnCl$_3$ (391 g, 1.53 mol) was placed in the flask and diluted with 3 L of hexanes. HNMe$_2$ was bubbled into the reaction flask at a rate of about 1.0 g/min. Over the course of 4 hours HNMe$_2$ (149.3 g, 3.30 mol) was added with an exotherm of about 20° C., resulting in the formation of a white precipitate. The reaction mixture was stirred at room temperature for about 18 h, filtered through a medium porosity frit, washed with 500 mL hexanes, and dried in-vacuo to give 477 g of a slightly tacky white solid (90.7%) in >99.0% purity. $^1$H-NMR (400 MHz, CDCl$_3$, 298K): 1.28 (t, 3H); 1.75 (q, 2H); 2.77 (s, 12H); 3.44 (s, 2H) ppm; $^{13}$C-NMR (100 MHz, CDCl$_3$, 298K): 12.75, 29.61, 38.88 ppm; $^{119}$Sn-NMR (149 MHz CDCl$_3$, 298K): –394.5 ppm.

EtSn(NMe$_2$)$_3$—Synthesis and Purification

A 12 L 4-neck flask with a mechanical stirrer assembly was charge with nBuLi (2.5 M, 1.73 L, 4.34 mol) which was diluted with 3 L of hexanes. The nBuLi solution was then cooled to an internal temperature of 0° C. using an IPA/liquid N$_2$ bath. Dimethylamine gas was bubbled into the reaction at a rate of about 1 g/min over the course of 5 hours with an internal reaction temperature less than 3° C. forming a viscous white mixture. The LiNMe$_2$ reaction mixture was warmed to room temperature and allowed to stir for about 72 hours. The LiNMe$_2$ mixture was cooled to about –2° C. using the IPA/N$_2$ bath and was then treated with a solution of EtSnCl$_3$(HNMe$_2$)$_2$ (477 g, 1.38 mol) in 3 L dimethoxyethane over the course of 2.5 hours in the dark (all subsequent steps performed in the dark as well) with an internal reaction temperature from about 1-2° C. resulting in a slightly yellow solution which was stirred for about 18 h at ambient temperature. The yellowish reaction mixture was stripped of solvent and other volatiles in-vacuo to give a tacky off-white/yellow solid which was slurried in 3 L hexanes and filtered through a medium porosity frit. The filtrates were then stripped of hexanes and other volatiles in-vacuo to give an orange oil as the crude product. The crude product was distilled using a 10" Vigreux column over a pressure range of 200 to 500 mtorr and a head temperature from 28 to 35° C. A 10 mL forecut was discarded and a main fraction of EtSn(NMe$_2$)$_3$ was collected as a colorless liquid (278 g, 0.99 mol, 72% yield) in 99.84% purity. $^1$H-NMR (400 MHz, C$_6$D$_6$, 298K): 0.99 (q, 2H); 1.15 (t, 3H); 2.73 (s, 18H) ppm; $^{13}$C-NMR (100 MHz, C$_6$D$_6$, 298K): 4.32, 10.14, 43.27 ppm; $^{119}$Sn-NMR (149 MHz, C$_6$D$_6$, 298K): –38.48 ppm.

Crystal Structure Data

As noted above, FIG. 1 is a three-dimensional solid state crystal structure depiction of iPrSnCl$_3$(HN(CH$_3$)$_2$)$_2$. The compound was subjected to x-ray crystallographic analysis and yielded the following data:

TABLE 2

Crystal data and structure refinement for iPrSnCl$_3$(HN(CH$_3$)$_2$)$_2$.

| | | |
|---|---|---|
| Report date | 2020 Dec. 11 | |
| Empirical formula | C7 H21 Cl3 N2 Sn | |
| Molecular formula | C7 H21 Cl3 N2 Sn | |
| Formula weight | 358.30 | |
| Temperature | 100.0K | |
| Wavelength | 0.71073 Å | |
| Crystal system | Monoclinic | |
| Space group | C 1 2/c 1 | |
| Unit cell dimensions | a = 20.4199(5) Å | α = 90°. |
| | b = 9.1826(2) Å | β = 109.1330(10)°. |
| | c = 15.8327(4) Å | γ = 90°. |
| Volume | 2804.76(12) Å3 | |
| Z | 8 | |
| Density (calculated) | 1.697 Mg/m3 | |
| Absorption coefficient | 2.361 mm-1 | |

TABLE 2-continued

Crystal data and structure refinement for iPrSnCl₃(HN(CH₃)₂)₂.

| | |
|---|---|
| F(000) | 1424 |
| Crystal size | 0.18 × 0.18 × 0.14 mm3 |
| Crystal color, habit | colorless irregular |
| Theta range for data collection | 2.111 to 26.371°. |
| Index ranges | −25 <= h <= 25, |
| | −11 <= k <= 11, |
| | −19 <= l <= 18 |
| Reflections collected | 14764 |
| Independent reflections | 2873 [R(int) = 0.0397] |
| Completeness to theta = 25.242° | 100.0% |
| Absorption correction | Semi-empirical from equivalents |
| Max. and min. transmission | 0.4910 and 0.4460 |
| Refinement method | Full-matrix least-squares on F2 |
| Data/restraints/ parameters | 2873/0/124 |
| Goodness-of-fit on F2 | 1.044 |
| Final R indices [I > 2sigma(I)] | R1 = 0.0157, wR2 = 0.0385 |
| R indices (all data) | R1 = 0.0172, wR2 = 0.0394 |
| Largest diff. peak and hole | 0.359 and −0.279 e·Å-3 |

In addition, as also noted above, FIG. 2 is a three-dimensional solid state crystal structure depiction of EtSnCl₃(HN(CH₃)₂)₂. The compound was subjected to x-ray crystallographic analysis and yielded the following data:

TABLE 3

Crystal data and structure refinement for EtSnCl₃(HN(CH₃)₂)₂.

| | | |
|---|---|---|
| Report date | 2021 Oct. 8 | |
| Empirical formula | C6 H19 Cl3 N2 Sn | |
| Molecular formula | C6 H19 Cl3 N2 Sn | |
| Formula weight | 344.27 | |
| Temperature | 100.0K | |
| Wavelength | 0.71073 Å | |
| Crystal system | Monoclinic | |
| Space group | P 1 21 1 | |
| Unit cell dimensions | a = 6.3562(3) Å | α = 90°. |
| | b = 12.1949(8) Å | β = 96.019(2)°. |
| | c = 8.3133(6) Å | γ = 90°. |
| Volume | 640.84(7) Å3 | |
| Z | 2 | |
| Density (calculated) | 1.784 Mg/m3 | |
| Absorption coefficient | 2.579 mm-1 | |
| F(000) | 340 | |
| Crystal size | 0.22 × 0.095 × 0.03 mm3 | |
| Crystal color, habit | colorless plate | |
| Theta range for data collection | 2.464 to 26.369°. | |
| Index ranges | −7 <= h <= 7, | |
| | −13 <= k <= 15, | |
| | −10 <= l <= 10 | |
| Reflections collected | 6343 | |
| Independent reflections | 2404 [R(int) = 0.0192] | |
| Completeness to theta = 25.242° | 99.8% | |
| Absorption correction | Semi-empirical from equivalents | |
| Max. and min. transmission | 0.4910 and 0.4172 | |
| Refinement method | Full-matrix least-squares on F2 | |
| Data/restraints/ parameters | 2404/1/119 | |
| Goodness-of-fit on F2 | 1.026 | |
| Final R indices | R1 = 0.0124, | |

TABLE 3-continued

Crystal data and structure refinement for EtSnCl₃(HN(CH₃)₂)₂.

| | |
|---|---|
| [I > 2sigma(I)] | wR2 = 0.0263 |
| R indices (all data) | R1 = 0.0127, |
| | wR2 = 0.0264 |
| Absolute structure parameter | −0.004(13) |
| Extinction coefficient | 0.0027(6) |
| Largest diff. peak and hole | 0.306 and −0.204 e·Å-3 |

Aspects

In a first aspect, the invention provides a composition comprising a compound of Formula (I):

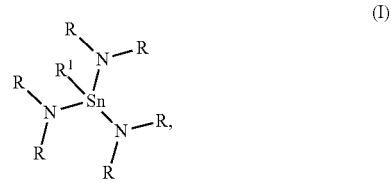

(I)

wherein each R is independently chosen from a $C_1$-$C_5$ alkyl group, and $R^1$ is chosen from a $C_1$-$C_5$ alkyl group, and wherein said composition comprises less than about 0.5% concentration, by mole, of a compound of Formula (II):

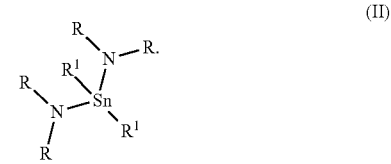

(II)

In a second aspect, the invention provides the composition of the first aspect, wherein R and $R^1$ are independently chosen from a $C_1$-$C_3$ alkyl group.

In a third aspect, the invention provides the composition of the first or second aspects, wherein the compound of Formula (I) is tris(dimethyl-amido)isopropyl tin; tris(diethylamido)isopropyl tin; tris(dipropylamido)isopropyl tin; tris(methylethylamido)isopropyl tin; tris(diisopropylamido)isopropyl tin; tris(di-t-butyl-amido)isopropyl tin; tris(di-n-butylamido)isopropyl tin; tris(di-sec-butylamido)isopropyl tin; tris(di-neopentylamido)isopropyl tin; tris(dimethylamido)methyl tin; tris(diethylamido)methyl tin; tris(di-n-propylamido)methyl tin; tris(methylethylamido)methyl tin; tris(diisopropylamido)methyl tin; tris(di-t-butylamido)methyl tin; tris(di-n-butylamido)methyl tin; tris(di-sec-butylamido) methyl tin; tris(di-neopentylamido)methyl tin; tris(dimethylamido)ethyl tin; tris(diethylamido)ethyl tin; tris(di-n-propylamido)ethyl tin; tris(methylethylamido)ethyl tin; tris(diisopropylamido)ethyl tin; tris(di-t-butylamido)ethyl tin; tris(di-n-butylamido)ethyl tin; tris(di-sec-butylamido)ethyl tin; tris(di-neopentylamido)ethyl tin; tris(dimethylamido)n-propyl tin; tris(diethylamido)n-propyl tin; tris(di-n-propylamido)n-propyl tin; tris(methylethylamido)n-propyl tin; tris(diisopropylamido)n-propyl tin; tris(di-t-butylamido)n-propyl tin; tris(di-n-butylamido)n-propyl tin; tris(di-sec-butylamido)n-propyl tin; tris(di-neopentylamido)n-propyl tin; tris(dimethylamido)n-butyl tin; tris(diethylamido)n-butyl tin; tris(dipropylamido)n-butyl tin; tris(methylethylamido)n-butyl tin; tris(diisopropylamido)n-butyl tin; tris(di-t-butylamido)n-butyl tin; tris(di-n-butylamido)n-butyl tin; tris(di-sec-butylamido)n-butyl tin; or tris(di-neopentylamido)n-butyl tin.

In a fourth aspect, the invention provides the composition of any one of the first through third aspects, wherein the compound of Formula (I) is tris(dimethylamido)isopropyl tin; tris(diethylamido)isopropyl tin; tris(dipropylamido)isopropyl tin; tris(methylethylamido)isopropyl tin; tris(diisopropylamido)isopropyl tin; tris(di-t-butylamido)isopropyl tin; tris(di-n-butylamido)isopropyl tin; tris(di-sec-butylamido)isopropyl tin; or tris(di-neopentylamido)isopropyl tin.

In a fifth aspect, the invention provides the composition of any one of the first through fourth aspects, wherein the compound of Formula (I) is tris(dimethylamido)isopropyl tin, and the compound of Formula (II) is bis(dimethylamido)diisopropyl tin.

In a sixth aspect, the invention provides the composition of any one of the first through fifth aspects, wherein the compound of Formula (II) is present in a concentration of less than about 0.1% by mole.

In a seventh aspect, the invention provides the composition of any one of the first through sixth aspects, wherein the compound of Formula (II) is present in a concentration of less than about 0.05% by mole.

In an eighth aspect, the invention provides the composition of any one of the first through seventh aspects, wherein the compound of Formula (II) is present in a concentration of less than about 0.03% by mole.

In a ninth aspect, the invention provides a process for preparing a composition comprising a compound of Formula (I):

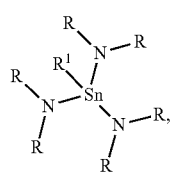

wherein each R is independently chosen from a $C_1$-$C_5$ alkyl group, and $R^1$ is chosen from a $C_1$-$C_5$ alkyl group, which comprises combining:
  a) a compound of Formula $R^1SnX_3$, wherein X is chosen from Cl, I, and Br,
  b) a compound of Formula $Li(R)_2N$, and
  c) a compound of Formula and $R_2NH$,
wherein the compound of Formula $R_2NH$ is present in a molar excess over the compound of Formula $R^1SnX_3$.

In a tenth aspect, the invention provides the process of the ninth aspect, wherein R and $R^1$ are independently chosen from a $C_1$-$C_3$ alkyl group.

In an eleventh aspect, the invention provides the process of the ninth or tenth aspects, wherein $R^1$ is isopropyl and X is chloro.

In a twelfth aspect, the invention provides the process of any one of the ninth through eleventh aspects, wherein the compound of Formula (I) is tris(dimethyl-amido)isopropyl tin; tris(diethylamido)isopropyl tin; tris(dipropylamido)isopropyl tin; tris(methylethylamido)isopropyl tin; tris(diisopropylamido)isopropyl tin; tris(di-t-butyl-amido)isopropyl tin; tris(di-n-butylamido)isopropyl tin; tris(di-sec-butylamido)isopropyl tin; tris(di-neopentylamido)isopropyl tin; tris(dimethylamido)methyl tin; tris(diethylamido)methyl tin; tris(di-n-propylamido)methyl tin; tris(methylethylamido)methyl tin; tris(diisopropylamido)methyl tin; tris(di-t-butylamido)methyl tin; tris(di-n-butylamido)methyl tin; tris(di-sec-butylamido)methyl tin; tris(di-neopentylamido)methyl tin; tris(dimethylamido)ethyl tin; tris(diethylamido)ethyl tin; tris(di-n-propylamido)ethyl tin; tris(methylethylamido)ethyl tin; tris(diisopropylamido)ethyl tin; tris(di-t-butylamido)ethyl tin; tris(di-n-butylamido)ethyl tin; tris(di-sec-butylamido)ethyl tin; tris(di-neopentylamido)ethyl tin; tris(dimethylamido)n-propyl tin; tris(diethylamido)n-propyl tin; tris(di-n-propylamido)n-propyl tin; tris(methylethylamido)n-propyl tin; tris(diisopropylamido)n-propyl tin; tris(di-t-butylamido)n-propyl tin; tris(di-n-butylamido)n-propyl tin; tris(di-sec-butylamido)n-propyl tin; tris(di-neopentylamido)n-propyl tin; tris(dimethylamido)n-butyl tin; tris(diethylamido)n-butyl tin; tris(dipropylamido)n-butyl tin; tris(methylethylamido)n-butyl tin; tris(diisopropylamido)n-butyl tin; tris(di-t-butylamido)n-butyl tin; tris(di-n-butylamido)n-butyl tin; tris(di-sec-butylamido)n-butyl tin; or tris(di-neopentylamido)n-butyl tin.

In a thirteenth aspect, the invention provides the process of any one of the ninth through twelfth aspects, wherein the compound of Formula (I) is chosen from tris(dimethylamido)isopropyl tin; tris(diethylamido)isopropyl tin; tris(dipropylamido)isopropyl tin; tris(methylethylamido)isopropyl tin; tris(diisopropylamido)isopropyl tin; tris(di-t-butylamido)isopropyl tin; tris(di-n-butylamido)isopropyl tin; tris(di-sec-butylamido)isopropyl tin; and tris(di-neopentylamido)isopropyl tin.

In a fourteenth aspect, the invention provides the process of any one of the ninth through thirteenth aspects, wherein the compound of Formula $R_2NH$ is dimethylamine and $R^1$ is isopropyl.

In a fifteenth aspect, the invention provides the process of any one of the ninth through fourteenth aspects, wherein the compound of Formula $Li(R)_2N$ is lithium dimethylamide, the compound of Formula $R_2NH$ is dimethylamine, and the compound of Formula $R^1SnX_3$ is isopropyl-tin trichloride.

In a sixteenth aspect, the invention provides the process of the fifteenth aspect, wherein the composition comprises less than about 0.5% of bis(dimethylamido)diisopropyl tin.

In a seventeenth aspect, the invention provides the process of the fifteenth or sixteenth aspects, wherein the composition comprises less than about 0.1% of bis(dimethylamido)diisopropyl tin.

In an eighteenth aspect, the invention provides the process of any one of the fifteenth through the seventeenth aspects, wherein the composition comprises less than about 0.05% of bis(dimethylamido)diisopropyl tin.

In a nineteenth aspect, the invention provides the process of any one of the ninth through eighteenth aspects, wherein the compound of Formula $R_2NH$ is present in at least about a 0.15 molar equivalents over the compound of Formula $R^1SnX_3$.

In a twentieth aspect, the invention provides a process of any of the ninth through the nineteenth aspects, wherein the compound of Formula (I) is prepared from a compound of Formula (A):

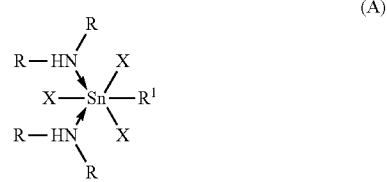

In a twenty-first aspect, the invention provides a process of the twentieth aspect, wherein the compound of Formula (A) is prepared by a reaction of the compound of Formula R$_2$NH and a compound of Formula R$^1$SnX$_3$, wherein the compound of Formula R$_2$NH is in excess of the compound of Formula R$^1$SnX$_3$.

In a twenty-second aspect, the invention provides a process of the twentieth or twenty-first aspects, wherein the compound of Formula (I) is prepared by reaction of the compound of Formula (A) and the compound of Formula Li(R)$_2$N.

In a twenty-third aspect, the invention provides a process of any one of the twentieth through twenty-second aspects, wherein the compound of Formula Li(R)$_2$N is present in a molar excess of about 3 to about 3.2 molar equivalents, relative to the compound of Formula (A).

In a twenty-fourth aspect, the invention provides a process of any one of the twentieth through twenty-third aspects, wherein the compound of Formula (I) is a compound of Formula (I-a):

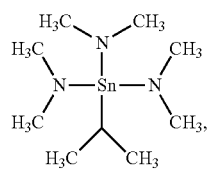

(I-a)

the compound of Formula (A) is a compound of Formula (A-a):

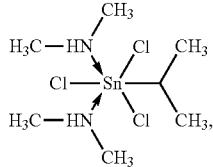

(A-a)

and the compound of Formula Li(R)$_2$N is lithium dimethylamide.

In a twenty-fifth aspect, the invention provides a process of any one of the twentieth through twenty-third aspects, wherein the compound of Formula (I) is a compound of Formula (I-d):

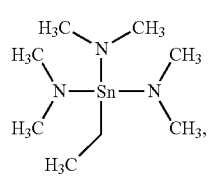

(I-d)

the compound of Formula (A) is a compound of Formula (A-d):

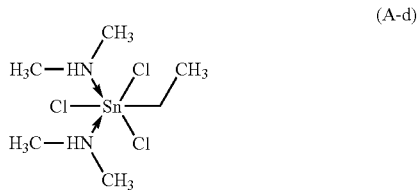

(A-d)

and the compound of Formula Li(R)$_2$N is lithium dimethylamide.

In a twenty-sixth aspect, the invention provides a process of any one of the twentieth through twenty-fifth aspects, wherein the compound of Formula R$^1$SnX$_3$, wherein X is chloro or bromo and R$^1$ is chosen from a C$_1$-C$_5$ alkyl group, is prepared by reacting a compound of Formula R$^1$SnR$^4$$_3$ and a mono iodo chloride or bromide respectively, wherein R$^4$ is chosen from aryl, C$_2$-C$_8$ alkenyl, and C$_2$-C$_8$ alkynyl.

In a twenty-seventh aspect, the invention provides a process of any one of the twentieth through twenty-fifth aspects, wherein the compound of Formula R$^1$SnX$_3$, wherein X is chloro, bromo, or iodo and R$^1$ is chosen from a C$_1$-C$_5$ alkyl group, is prepared by contacting a compound of Formula R$^1$SnR$^2$$_3$, wherein R$^2$ is chosen from aryl or C$_2$-C$_8$ alkenyl, with a compound of Formula SnX$_4$.

In a twenty-eighth aspect, the invention provides a compound of Formula (A-a):

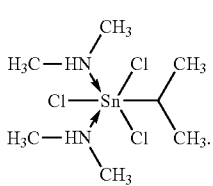

(A-a)

Figure 1:
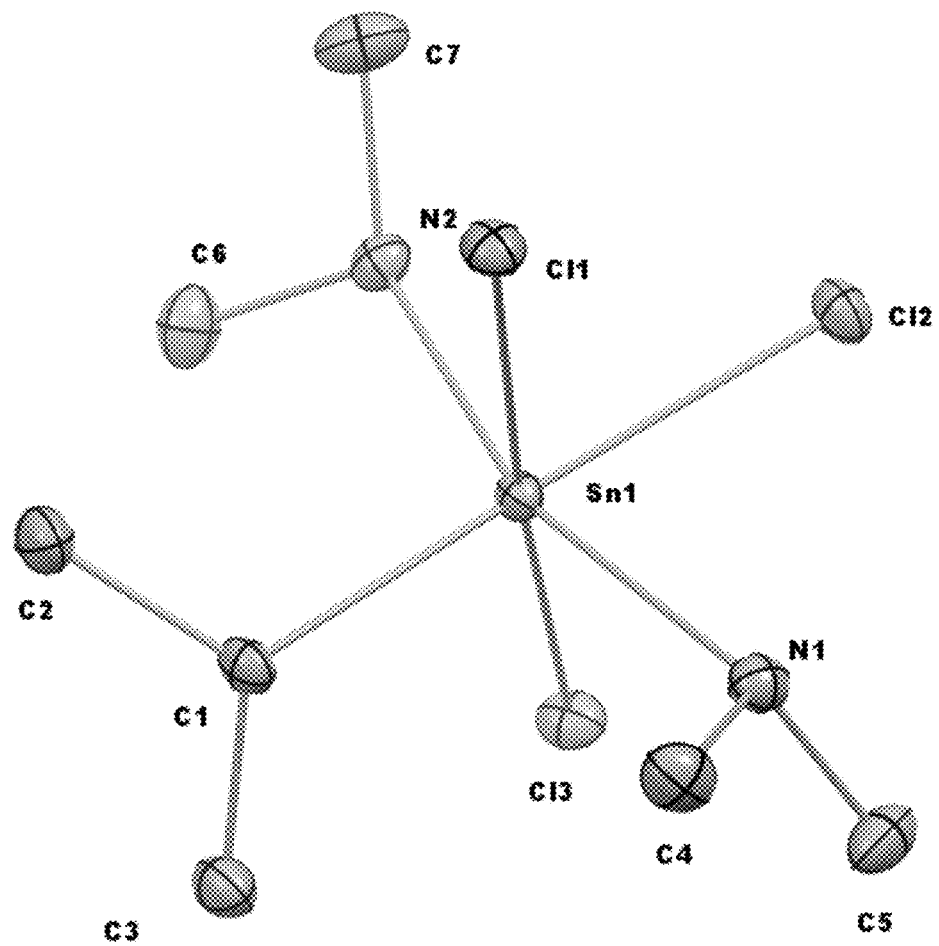
FIG. 1 is a crystal structure depiction of a compound of Formula (A-a)

In a twenty-ninth aspect, the invention provides a compound of the twenty-eighth aspect in crystalline form as depicted in FIG. 1.

In a thirtieth aspect, the invention provides a compound of Formula (A-d):

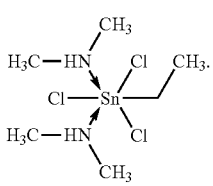

(A-d)

In a thirty-first aspect, the invention provides a compound of the thirtieth aspect in crystalline form as depicted in FIG. 2.

In a thirty-second aspect, the invention provides a process for preparing a compound of Formula R$^1$SnX$_3$, wherein X is chloro or bromo and R$^1$ is chosen from a C$_1$-C$_5$ alkyl group, which comprises reacting a compound of Formula R$^1$SnR$^4$$_3$ with a mono iodo chloride or bromide respectively, wherein R$^4$ is chosen from aryl, C$_2$-C$_8$ alkenyl, and C$_2$-C$_8$ alkynyl.

In a thirty-third aspect, the invention provides a process for preparing a compound of Formula R$^1$SnX$_3$, wherein X is chloro, bromo, or iodo and R$^1$ is chosen from a C$_1$-C$_5$ alkyl group, which comprises contacting a compound of Formula $R^1SnR^2_3$ with a compound of the formula $SnX_4$, wherein $R^2$ is chosen from aryl or $C_2$-$C_8$ alkenyl.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A compound of Formula (A-a):

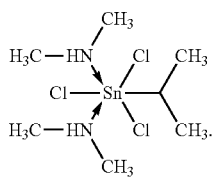

(A-a)

2. The compound of claim 1, in crystalline form as depicted in FIG. 1.

3. A compound of Formula (A-d):

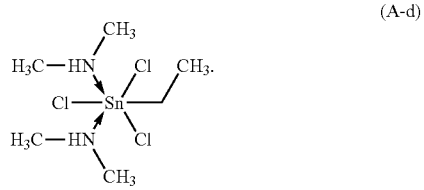

(A-d)

4. The compound of claim 3, in crystalline form as depicted in FIG. 2.

* * * * *